United States Patent Office 3,449,685
Patented June 10, 1969

3,449,685
AUTOMATIC RANGE SELECTOR EMPLOYING PLURAL AMPLIFIERS OF DIFFERENT GAINS
Julian C. Holmes, Friendly, Md., assignor to the United States of America as represented by the Secretary of the Navy
Filed Apr. 25, 1967, Ser. No. 634,797
Int. Cl. H03g 3/30; H03f 1/14, 3/68
U.S. Cl. 330—29                           1 Claim

ABSTRACT OF THE DISCLOSURE

An automatic range selector system for selecting from a group of amplifiers having different sensitivities but common inputs the highest sensitivity amplifier having a signal at its output within a predetermined range. A single channel recording device covering the predetermined range can be coupled to the output of the automatic range selector and can be used for gathering information from the highest sensitivity amplifier which has an output within the predetermined, on-scale range of the recorder.

Background of the invention

In the field of automatic range selectors it has been the general practice to employ devices, such as the Keithley Range-Switching Electrometer, to perform the range selecting operation. The Keithley Range-Switching Electrometer accomplishes the range selection task by changing the current gain of a single amplifier circuit in three discrete steps. Although such devices have served the purpose they have not proved entirely satisfactory under all conditions of service for the reason that the logic is complex. This is because the sensing circuit must sense a signal, the amplitude of which depends upon the previous switching operation performed by the same sensing circuits.

Summary of the invention

The general purpose of this invention is to provide an automatic range selector system which embraces all the advantages of similarly employed systems and possesses none of the aforedescribed disadvantages. To attain this the present invention contemplates a unique arrangement of a plurality of amplifiers having different sensitivities and a plurality of switches, one each coupled to the output of each of the amplifiers, whereby the amplifier having the highest sensitivity and an output signal within a predetermined range is selected to provide the input to a single channel recording device. The recording device is thus used for gathering information from whatever amplifier has a reading that is on-scale for the recorder and at the same time from the amplifier having the highest possible sensitivity.

An object of the present invention is the provision of an automatic range selector having simple logic.

Another object is to provide an automatic range selector which only requires the use of a single channel recording device although a plurality of amplifier channels are used.

Other objects and features of the invention will become apparent to those skilled in the art as the disclosure is made by the following description of a preferred embodiment of the invention as illustrated in the accompanying sheets of drawings.

Description of the preferred embodiments

Figure 1:
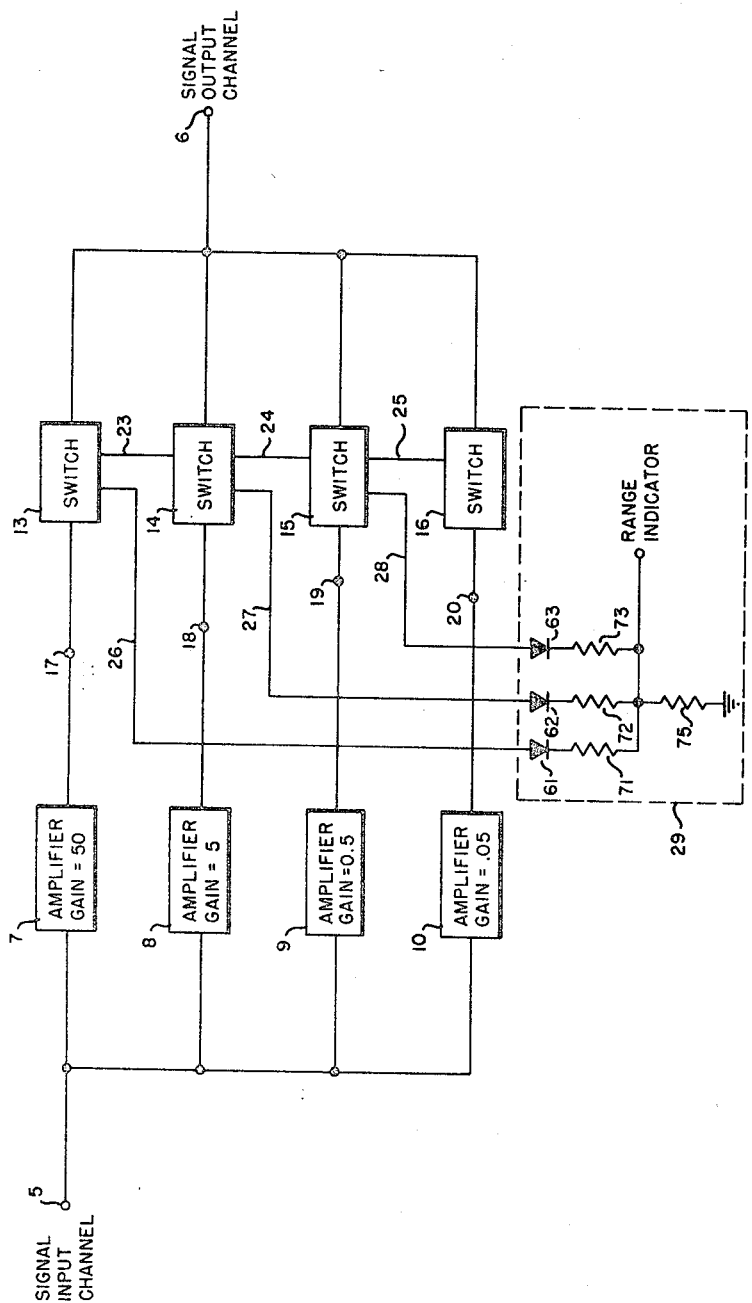
FIG. 1 shows, partly in block diagram form and partly in schematic, a preferred embodiment of the invention.

Referring now to the drawings, wherein like reference characters designate like or corresponding parts throughout the several views, there is shown in FIG. 1 one signal input terminal 5 and one signal output terminal 6. Coupled to the input terminal 5 are four amplifiers 7 through 10, each differing in gain from the next by a factor of 10. Although four amplifiers are shown it is to be understood that more or fewer amplifiers could be used and that the gains of the amplifiers could be different from those shown in FIG. 1. Switches 13 through 16 are coupled through terminals 17 through 20 to the outputs of amplifiers 7 through 10, respectively; and the outputs of switches 13 through 16 are each coupled to the output terminal 6, which may be coupled to the input of a single channel recorder (not shown) having an on-scale range, for example, of from 0 to +5 volts. Again, it should be understood that the range of 0 to +5 volts is used merely for the purpose of explanation and that recorders with other on-scale ranges may be used.

The switches 13 through 16 are also coupled together by electrical connections 23 through 25; and each of the switches 13 through 15 is electrically coupled by lines 26 through 28, respectively, to range indicator 29.

Because of the requirements of the recorder (not shown) or other device which may be coupled to output terminal 6, the useful range of each amplifier output is from 0 to +5 volts, wherein the signals produce positive voltage excursions. When the output of a given amplifier exceeds +5 volts no further useful information can be obtained from it, since a signal above +5 volts would be off scale for the recorder (not shown) or other device coupled to terminal 6.

When no signal is present at the signal input terminal 5, all the switches except switch 13 are open. When a low amplitude signal is applied to the input terminal 5 and as it increases in value the output of amplifier 7 approaches +5 volts. When this occurs switch 13, which has been closed so as to connect the output of amplifier 7 to the output terminal 6, is opened which simultaneously causes switch 14 to be closed. As a result, switch 14 then couples the output of amplifier 8 to the output terminal 6.

As the amplitude of the input signal applied to input terminal 5 increases the signal output of amplifier 8 approaches +5 volts. When +5 volts is reached switch 14 is opened and switch 15 is simultaneously closed. Thus, amplifier 9 is then connected to the signal output terminal or channel 6. Similarly, when the signal output of amplifier 9 reaches +5 volts switch 15 is opened and switch 16 is simultaneously closed so that amplifier 10 is coupled to the signal output terminal 6.

If the value of the signal applied to input terminal 5 then begins to decrease the switches 13 through 16 operate in reverse sequence with one switch being closed at a time so as to couple to output terminal 6 the amplifier having the highest sensitivity which has a signal output of less than +5 volts.

In addition, in order that the particular amplifier which has its output coupled to terminal 6 can be identified, each switch 13 through 16 is coupled to range indicator 29, the voltage across which will be one of four discrete values, each of which indicates that a particular switch and amplifier are in use.

Figure 2:
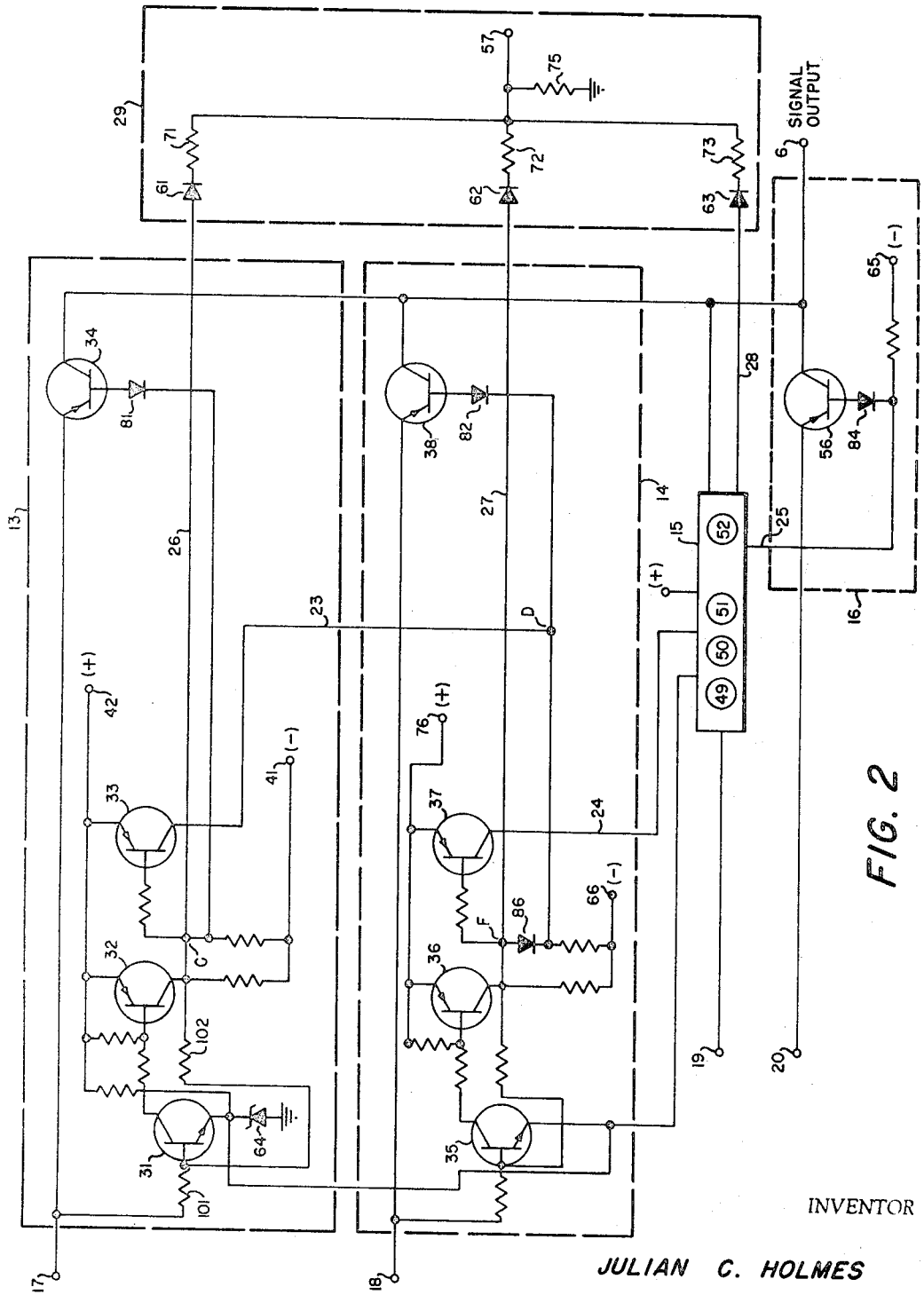
FIG. 2 illustrates in schematic and block diagram form a portion of the invention as disclosed in FIG. 1.

Referring now to FIG. 2 there is shown the terminal 17 which couples amplifier 7 to switch 13. In addition, the terminals 18, 19 and 20 are shown which couple amplifiers 8 through 10 to switches 14 through 16, respectively. When the value of the signal from the signal input terminal 5 is very low so that the output from amplifier 7, which has a gain of 50, is between 0 and +5 volts the transistors 31 and 32 are in an off condition while transistor 33 is in an on condition. At the same time, because transistor 32 is turned off, the point C is far enough negative from the influence of the negative bias at terminal 41 so that transistor 34 is turned on. Also, because transistor 33 is turned on, the potential at point D is high as a result of the conduction path through transistor 33 from the positive bias at terminal 42. Because the potential at point D is high, transistor 38 in switch 14 is in an off condition.

If the output from amplifier 7, which amplifier has a gain of 50, is between 0 and +5 volts it is clear that the amplitudes of the signals at the outputs of amplifiers 8–10, which have gains of 5, 0.5 and .05, respectively, will be less than the value of the output from amplifier 7. Thus, transistors 35 and 36 of switch 14 are off while transistor 37 of switch 14 is in an on condition. Similarly, during this time when switch 14 is off, the transistors in switch 15 (which transistors are not shown but which are represented by numerals 49 through 52) are in the same conducting conditions as are the transistors in switch 14 which transistors are located in the same relative positions within their respective switches. Thus, when the value of the signal at terminal 19 is less than +5 volts the transistors 49 and 50 are in an off condition, as is transistor 52, while transistor 51 is in an on condition.

As a result, when the signal from signal input terminal 5 is very weak so that even the output from amplifier 7 is between 0 and +5 volts, this signal is sent through transistor 34 of switch 13 to the signal output terminal 6 where it is recorded or observed. At the same time, it must be determined through which amplifier-switch combination the output signal at terminal 6 has passed in order to determine the actual value of the input signal at terminal 5. This is accomplished by means of the range indicator 29. When the signal value from the output of amplifier 7 is between 0 and +5 volts the point C in switch 13 is characterized by a negative potential so that no current flows through the line 26 and the diode 61. Similarly, no current flows through the lines 27 and 28 in switches 14 and 15, respectively. As a result the voltage at terminal 57 of the range indicator 29 is zero; and this zero reading indicates to the observer that the signal at output terminal 6 has passed through amplifier 7, which has a gain of 50, so that the true value of the signal input to amplifier 7 from input terminal 5 can thus be determined.

As the value of the signal from signal input terminal 5 increases the outputs from all of the amplifiers 7 through 10 also increase, but the output from amplifier 7 will reach +5 volts before the outputs from amplifiers 8 through 10 reach that value. When this occurs the transistor 31 is turned on. A Zener diode 64, which is coupled to the emitter of transistor 31, is chosen to have a threshold voltage of approximately 4.5 volts so that transistor 31 does, in fact, turn on when the voltage input to amplifier 7 reaches +5 volts. When transistor 31 is turned on, transistor 32 is also turned on. When this occurs, transistor 33, which has been on, is turned off because the potential at point C increases. This increase in potential occurs because there is an effective short circuit from positive bias terminal 42 through transistor 32 to point C. Similarly, because the potential at point C is so greatly increased the transistor 34 is turned off since the potential at the base of the transistor 34 is also greatly increased.

Because transistor 33 in switch 13 is turned off, the potential at the collector of transistor 33 at point D in switch 14 is greatly reduced and is influenced by the negative bias at terminal 66. This low potential at point D, which is located in the base circuit of transistor 38, turns transistor 38 to an on condition. Thus, the signal output from amplifier 7 is no longer coupled to the signal output terminal 6 because transistor 34 is in an off condition. Rather, the signal output from amplifier 8 is coupled through transistor 38 to the signal output terminal 6. Because the gain of amplifier 8 is only one-tenth that of the amplifier 7, the value of the signal output of amplifier 8 is now between 0 and +5 volts, while the value of the signal output from amplifier 7 is in excess of +5 volts. However, the output of amplifier 7 is no longer coupled to the signal output terminal 6 so this signal in excess of +5 volts will not affect the recording device (not shown) which may be coupled to terminal 6. In this manner the value of the signal at the output terminal 6 is always maintained between 0 and +5 volts so as to facilitate the use of a recording apparatus (not shown) which has an on-scale reading of only 0 to +5 volts.

Even though transistor 34 is in an off condition so that the output of amplifier 7 is disconnected from the signal output terminal 6, the transistors 31 and 32 of switch 13 remain in an on condition since the value of the input signal to amplifier 7 is in excess of +5 volts. Because the transistor 32 of switch 13 is now in an on condition, the potential at point C approaches that at bias terminal 42, which is positive, so that current passes through line 26, diode 61, resistor 71 and resistor 75 to ground. As a result, a voltage is present at terminal 57 of range indicator 29, the value of which is determined by the voltage drop across resistors 71 and 75. Thus, a distinctive voltage will be present at terminal 57 when the amplifier 8 is coupled to the signal output terminal 6 by means of switch 14, and the true value of the signal at input terminal 5 can be determined since it is known that this signal has passed through amplifier 8, which has a gain of 5.

In a similar manner when the output voltage from amplifier 8 at terminal 18 reaches +5 volts, transistors 35 and 36 are turned on, while transistor 37 is turned off. This results in transistor 38 being turned off and the corresponding transistor 52 (not shown) of switch 15 being turned on so as to connect the output of amplifier 9 to signal output terminal 6. When transistor 36 of switch 14 is turned on the potential at point F is greatly increased because of the conduction path from positive bias terminal 76 through transistor 36; and as a result current flows through the line 27, diode 62, resistor 72, and resistor 75. Since current continues to flow through diode 61 and resistor 71 because transistor 32 is still on, the voltage at terminal 57 of range indicator 29 is determined by the voltage drop across resistors 71 and 72 in parallel and across resistor 75. Thus, a distinct voltage is present at terminal 57 when the output of amplifier 9 is coupled to signal output terminal 6 by means of switch 15, and the true value of the signal at input terminal 5 can be determined by observing the value of the signal at output terminal 6 and by observing the voltage at terminal 57, which will indicate which of the amplifiers 7–10 is directly coupled to the signal output terminal 6.

When the value of the signal at the output of amplifier 9 as applied to terminal 19 reaches +5 volts the transistors 49 and 50 (not shown) are turned on while the transistor 51 (not shown) is turned off. The switch 15 operates in the same manner as the switches 13 and 14 so that when transistor 51, which corresponds to transistors 33 and 37 in switches 13 and 14, is turned off transistor 52 (not shown), which corresponds to transistor 34 and 38 in switches 13 and 14, is also turned off. Transistor 56, of switch 16, is then turned on, and the negative bias voltage at terminal 65 allows transistor 56 to be turned on.

The output of amplifier 9 is, thus, disconnected from the signal output terminal 6 and the output of amplifier 10 is directly coupled to the signal output terminal 6 by means of transistor 56. As occurred previously in switches 13 and 14, current now flows through line 28, diode 63, resistor 73, and resistor 75 to ground. Current therefore flows through all three diodes 61, 62 and 63 and through resistor 75 so that the voltage at terminal 57 of range indicator 29 is determined by the voltage drop across resistors 71, 72 and 73, which are coupled in parallel, and across resistor 75. Thus, a distinct voltage is present at terminal 57 so as to indicate that the output of amplifier 10 is coupled to the signal output terminal 6.

The diodes 81, 82, 84 and a similar diode (not shown) in switch 15 are located in the circuit to prevent conduction of current through their respective transistors from the bases to the emitters in a reverse direction during the times when the respective transistors are in an off condition and when large values of reverse bias potential are present.

The diode 86 in switch 14 and a similar diode (not shown) in switch 15 are placed in the circuit to act as one-way valves. For example, in switch 14 the diode 86 acts to prevent point F from going positive when transistor 33 of switch 13 is on and point D is positive. This acts to prevent transistor 35 and 36 from turning on when transistor 33 is on. This is necessary because transistors 35 and 36 are to go on only when the input to transistor 35 at terminal 18 exceeds +5 volts.

With signals of decreasing amplitude at signal input terminal 5, the switches 13 through 16 operate in a reverse sequence with one switch being closed at a time so as to continue to couple the highest sensitivity amplifier to the single output terminal 6 which has an output of from 0 to +5 volts. For example, if the value of the signal output from amplifier 8 as applied to terminal 18 is somewhere between 0 and +5 volts and decreasing, the transistor 38 is on so that the output of amplifier 8 is directly coupled through switch 14 to signal output terminal 6. However, as the signal value at input terminal 5 decreases further the output of amplifier 7 drops below +5 volts. When this occurs transistors 31 and 32 of switch 13 are turned off, and transistor 33 is again turned on. When transistor 33 is turned to an on condition, the potential at the collector of transistor 33 and at point D of switch 14 will be increased to a positive value approaching that of the bias at terminal 42. Consequently, the transistor 38 of switch 14 will be turned off and transistor 34 of switch 13 will be turned on because the potential at point C drops due to the negative bias at terminal 41 when transistor 32 is off. Thus, as the value of the signal at input terminal 5 decreases, the output of amplifier 8 is disconnected from the signal output terminal 6 and the output of amplifier 7 is simultaneously coupled to the signal output terminal 6.

Instead of having each of the switches closed when the input voltage exceeds, for example, 5 volts and open when the input voltage drops below 5 volts, the switches are designed to close when the input voltage exceeds 5 volts, but to open only when the input voltage drops to a predetermined voltage below 5 volts, e.g. 4.8 volts. This difference between the turn-on and the turn-off voltages for the switches avoids hunting by the circuit if the input signal contains noise. This setting of the turn-on and turn-off voltages is accomplished, for example, in switch 13 by means of resistors 101 and 102. By controlling the values of resistors 101 and 102, the point at which transistor 31 will be turned off can be controlled. For example, when transistor 32 is in an on condition the potential at point C will be highly positive and will be approximately the potential of the positive bias at terminal 42. When transistor 32 is on transistor 31 is also on and is conducting current from point C through its base and emitter and through the Zener diode 64 to ground. When the voltage input to transistor 31, which appears at its base, is reduced to a value so that the current from point C is diverted from the base of transistor 31 to resistor 101, the transistor 31 is turned off. For the purpose of explanation the value of the voltage input to transistor 31 which will turn it off is set at approximately 4.8 volts.

This invention provides for an automatic range selector which acts to select from a group of amplifiers having different sensitivities but common inputs the highest sensitivity amplifier having a signal output within a desired and predetermined range. By the use of this invention a single recording device may be used for gathering information from whatever amplifier has an output within the desired range; whereas, if no range selector were used, separate recorders would be needed for each amplifier even though there would be at any instant of time only one amplifier which would carry the most useful information.

It should be understood that although specific values may have been used in the description of this invention they were merely for the purpose of explanation and to facilitate an understanding of the invention and should in no way be construed to limit the invention to the specific values described. Similarly, it should be understood that the foregoing disclosure relates to only a preferred embodiment of the invention and that numerous modifications or alternations may be made therein without departing from the spirit and the scope of the invention.

The invention described herein may be manufactured and used by or for the Government of the United States of America for governmental purposes without the payment of any royalties thereon or therefor.

What is claimed and desired to be secured by Letters Patent of the United States is:

1. An automatic range selector for producing output signals within a predetermined dynamic amplitude range which is a portion of the full amplitude range of input signals applied thereto, comprising:

a plurality of amplifying means having a common input terminal for producing a plurality of amplified output signals, each of said plurality of amplifying means providing a different amount of signal gain;

gate means coupled to receive the amplified output signals from that one of said plurality of amplifying means having the least amount of signal gain, for passing said signals to a common output terminal;

a plurality of switching means coupled to said common output terminal, each one of said switching means being associated with a different one of said amplifying means and including:

(1) bistable means coupled to receive the amplified output signals from said one of said amplifying means, for producing a first output signal when said amplified output signals of said one of said amplifying means are within said predetermined dynamic amplitude range and a second output signal when said amplified output signals of said one of said amplifying means exceed said predetermined range, (2) gate means coupled to receive said amplified output signals from said one of said amplifying means and said bistable means, for enabling the passage of said amplified output signals of said one of said amplifying means to said common output terminal upon receipt of said first output signal of said bistable means and for blocking the passage of said amplified output signals of said one of said amplifying means upon receipt of said second output signal of said bistable means, and (3) blocking means, including at least one transistor device, coupled to said bistable means and to the gate means associated with that other one of said plurality of amplifying means having the greatest amount of signal gain which is less than the signal gain of said one of said amplifying means, for producing a blocking signal only upon receipt of the said second output signal of said bistable means, for inhibiting said gate means associated with the other one of said plurality of amplifying means from passing its associated amplified output signals to said common output terminal; and range indicator means including a plurality of resistors each one connected in series with a respective one of a plurality of diodes to form a plurality of networks each coupled at one end to a point of reference potential through a common resistor and coupled at the other end to receive the blocking signal from a respective one of said plurality of switching means, for producing an indication of the gain of the selector; whereby signals applied to said input terminal are automatically amplified by that one of said plurality of amplifying means which produces the maximum amplitude output signal within said predetermined dynamic amplitude range.

References Cited

UNITED STATES PATENTS

| | | | |
|---|---|---|---|
| 2,541,039 | 2/1951 | Cole | 328—116 |
| 3,041,469 | 6/1962 | Russ | 307—235 |
| 3,254,307 | 5/1966 | Falk | 330—28 |
| 3,264,574 | 8/1966 | Loofbourrow | 330—124 X |
| 3,325,778 | 6/1967 | Ballard | 330—124 X |
| 3,350,571 | 10/1967 | Moulton et al. | 330—124 X |

ROY LAKE, *Primary Examiner.*

J. B. MULLINS, *Assistant Examiner.*

U.S. Cl. X.R.

330—51, 124